US011111720B2

(12) United States Patent
Peters et al.

(10) Patent No.: US 11,111,720 B2
(45) Date of Patent: Sep. 7, 2021

(54) LOW POWER DRIVER FOR PRIVACY GLAZING (71) Applicant: Cardinal IG Company, Eden Prairie, MN (US)

(72) Inventors: Chad Peters, Prior Lake, MN (US); Nicholas Schleder, Saint Paul, MN (US); Eric Bjergaard, Minneapolis, MN (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 16/786,500

(22) Filed: Feb. 10, 2020

(65) Prior Publication Data
US 2020/0256121 A1 Aug. 13, 2020

Related U.S. Application Data (60) Provisional application No. 62/802,839, filed on Feb. 8, 2019.

(51) Int. Cl.
*G02F 1/13* (2006.01)
*E06B 9/24* (2006.01)
*G02F 1/163* (2006.01)

(52) U.S. Cl.
CPC ............. *E06B 9/24* (2013.01); *G02F 1/1323* (2013.01); *G02F 1/163* (2013.01); *E06B 2009/2464* (2013.01)

(58) Field of Classification Search
CPC .................................................. G02F 1/1323
See application file for complete search history.

(56) References Cited

U.S. PATENT DOCUMENTS

| 3,951,846 A | 4/1976 | Gavrilovic |
| 3,953,630 A | 4/1976 | Roberts et al. |

(Continued)

FOREIGN PATENT DOCUMENTS

| CN | 201226062 Y | 4/2009 |
| CN | 101775953 A | 7/2010 |

(Continued)

OTHER PUBLICATIONS

Bortolozzo et al., Abstract of "Transmissive Liquid Crystal Light-valve for Near-Infrared Applications," Appl. Opt., 52(22), Aug. 2013, accessed on the internet at https://www.osapublishing.org/ao/abstract.cfm?uri=ao-52-22-E73, retrieved Sep. 26, 2019, 2 pages.

(Continued)

*Primary Examiner* — Sang V Nguyen
(74) *Attorney, Agent, or Firm* — Fredrikson & Byron, P.A.

(57) ABSTRACT

A driver may be used to drive an electrically controllable optically active material in a privacy structure. In some examples, the driver receives power from a power source at a supply voltage and a supply apparent power level and converts the power received from the power source down to a converted voltage and a converted apparent power level. The converted voltage is less than the supply voltage and the converted apparent power level is less than the supply apparent power level. The driver may deliver power at the converted voltage and the converted apparent power level to a voltage convertor, which increase the converted voltage to an operating voltage. The driver can further condition power received from the voltage convertor having the operating voltage and operating apparent power level to provide a drive signal and provide the drive signal the electrically controllable optically active material of the privacy structure.

26 Claims, 6 Drawing Sheets (56) References Cited

U.S. PATENT DOCUMENTS

| | | |
|---|---|---|
| 4,047,351 A | 9/1977 | Derner et al. |
| 4,150,877 A | 4/1979 | Kobale et al. |
| 4,277,294 A | 7/1981 | Orcutt |
| 4,284,677 A | 8/1981 | Herliczek |
| 4,465,340 A | 8/1984 | Suganuma |
| 4,587,784 A | 5/1986 | Chavy et al. |
| 4,614,676 A | 9/1986 | Rehfeld |
| 4,702,566 A | 10/1987 | Tukude |
| 4,749,261 A | 6/1988 | McLaughlin et al. |
| 4,932,608 A | 6/1990 | Heidish et al. |
| 4,958,917 A | 9/1990 | Hashimoto et al. |
| 5,076,673 A | 12/1991 | Lynam et al. |
| 5,103,336 A | 4/1992 | Sieloff |
| 5,111,329 A | 5/1992 | Gajewski et al. |
| 5,111,629 A | 5/1992 | Baughman et al. |
| 5,142,644 A | 8/1992 | Vansteenkiste et al. |
| 5,151,824 A | 9/1992 | O'Farrell |
| 5,154,953 A | 10/1992 | De Moncuit et al. |
| 5,164,853 A | 11/1992 | Shimazaki |
| 5,168,387 A | 12/1992 | Asakura et al. |
| 5,197,242 A | 3/1993 | Baughman et al. |
| 5,202,787 A | 4/1993 | Byker et al. |
| 5,239,406 A | 8/1993 | Lynam |
| 5,244,557 A | 9/1993 | Defendini et al. |
| 5,408,353 A | 4/1995 | Nichols et al. |
| 5,589,958 A | 12/1996 | Lieb |
| 5,643,644 A | 7/1997 | Demars |
| 5,668,663 A | 9/1997 | Varaprasad et al. |
| 5,766,755 A | 6/1998 | Chaussade et al. |
| 5,796,452 A | 8/1998 | Pierson |
| 5,855,638 A | 1/1999 | Demars |
| 5,889,608 A | 3/1999 | Buffat et al. |
| 6,001,487 A | 12/1999 | Ladang et al. |
| 6,055,088 A | 4/2000 | Fix et al. |
| 6,061,105 A | 5/2000 | Nakagawa |
| 6,064,509 A | 5/2000 | Tonar et al. |
| 6,143,209 A | 11/2000 | Lynam |
| 6,261,652 B1 | 7/2001 | Poix et al. |
| 6,280,041 B1 | 8/2001 | Unger et al. |
| 6,297,900 B1 | 10/2001 | Tulloch et al. |
| 6,317,248 B1 | 11/2001 | Agrawal et al. |
| 6,340,963 B1 | 1/2002 | Anno et al. |
| 6,366,391 B1 | 4/2002 | Hurtz |
| 6,373,618 B1 | 4/2002 | Agrawal et al. |
| 6,407,847 B1 | 6/2002 | Poll et al. |
| 6,466,298 B1 | 10/2002 | Fix et al. |
| 6,486,928 B1 | 11/2002 | Lin et al. |
| 6,567,708 B1 | 5/2003 | Bechtel et al. |
| 6,589,613 B1 | 7/2003 | Kunert |
| 6,594,067 B2 | 7/2003 | Poll et al. |
| 6,621,534 B2 | 9/2003 | Lin et al. |
| 6,639,708 B2 | 10/2003 | Elkadi et al. |
| 6,643,050 B2 | 11/2003 | Rukavina et al. |
| 6,671,008 B1 | 12/2003 | Li et al. |
| 6,671,080 B2 | 12/2003 | Poll et al. |
| 6,795,226 B2 | 9/2004 | Agrawal et al. |
| 6,819,467 B2 | 11/2004 | Lynam |
| 6,829,074 B2 | 12/2004 | Terada et al. |
| 6,829,511 B2 | 12/2004 | Bechtel et al. |
| 6,842,276 B2 | 1/2005 | Poll et al. |
| 6,950,221 B1 | 9/2005 | Terada et al. |
| 7,002,720 B2 | 2/2006 | Beteille et al. |
| 7,009,665 B2 | 3/2006 | Li et al. |
| 7,023,600 B2 | 4/2006 | Mallya et al. |
| 7,033,655 B2 | 4/2006 | Beteille et al. |
| 7,081,929 B2 | 7/2006 | Furuki et al. |
| 7,085,609 B2 | 8/2006 | Bechtel et al. |
| 7,173,750 B2 | 2/2007 | Rukavina |
| 7,230,748 B2 | 6/2007 | Giron et al. |
| 7,300,166 B2 | 11/2007 | Agrawal et al. |
| 7,423,664 B2 | 9/2008 | Ukawa |
| 7,502,156 B2 | 3/2009 | Tonar et al. |
| 7,505,188 B2 | 3/2009 | Niiyama et al. |
| 7,525,714 B2 | 4/2009 | Poll et al. |
| 7,542,809 B2 | 6/2009 | Bechtel et al. |
| 7,671,948 B2 | 3/2010 | Ninomiya |
| 7,719,751 B2 | 5/2010 | Egerton et al. |
| 7,738,155 B2 | 6/2010 | Agrawal et al. |
| 7,746,534 B2 | 6/2010 | Tonar et al. |
| 7,817,327 B2 | 10/2010 | Derda |
| 7,822,490 B2 | 10/2010 | Bechtel et al. |
| 7,872,791 B2 | 1/2011 | Karmhag et al. |
| 7,876,400 B2 | 1/2011 | Baliga et al. |
| 7,906,203 B2 | 3/2011 | Hartig |
| 7,960,854 B2 | 6/2011 | Paulus et al. |
| 7,990,603 B2 | 8/2011 | Ash et al. |
| 8,102,478 B2 | 1/2012 | Xue |
| 8,164,818 B2 | 4/2012 | Collins et al. |
| 8,169,587 B2 | 5/2012 | Bolton |
| 8,187,682 B2 | 5/2012 | Albrecht et al. |
| 8,189,254 B2 | 5/2012 | Voss et al. |
| 8,199,264 B2 | 6/2012 | Veerasamy |
| 8,213,074 B1 | 7/2012 | Shrivastava et al. |
| 8,218,224 B2 | 7/2012 | Kwak et al. |
| 8,219,217 B2 | 7/2012 | Bechtel et al. |
| 8,263,228 B2 | 9/2012 | Torr |
| 8,289,609 B2 | 10/2012 | Lamine et al. |
| 8,343,571 B2 | 1/2013 | Werners et al. |
| 8,355,112 B2 | 1/2013 | Bolton |
| 8,482,838 B2 | 7/2013 | Sbar et al. |
| 8,547,624 B2 | 10/2013 | Ash et al. |
| 8,551,603 B2 | 10/2013 | Thompson |
| 8,610,992 B2 | 12/2013 | Varaprasad et al. |
| 8,619,204 B2 | 12/2013 | Saitoh et al. |
| 8,643,933 B2 | 2/2014 | Brown |
| 8,711,465 B2 | 4/2014 | Bhatnagar et al. |
| 8,810,889 B2 | 8/2014 | Brown |
| 8,869,493 B2 | 10/2014 | Chubb et al. |
| 8,913,215 B2 | 12/2014 | Yang et al. |
| 8,941,788 B2 | 1/2015 | Brecht et al. |
| 8,970,810 B2 | 3/2015 | Bowser et al. |
| 8,975,789 B2 | 3/2015 | Snyker et al. |
| 8,995,039 B2 | 3/2015 | Bartug et al. |
| 9,019,588 B2 | 4/2015 | Brown et al. |
| 9,036,242 B2 | 5/2015 | Bergh et al. |
| 9,091,868 B2 | 7/2015 | Bergh et al. |
| 9,097,842 B2 | 8/2015 | Van Nutt et al. |
| 9,102,124 B2 | 8/2015 | Collins et al. |
| 9,128,346 B2 | 9/2015 | Shrivastava et al. |
| 9,158,173 B2 | 10/2015 | Bhatnagar et al. |
| 9,176,357 B2 | 11/2015 | Lam et al. |
| 9,193,135 B2 | 11/2015 | Boote et al. |
| 9,316,883 B2 | 4/2016 | Sbar et al. |
| 9,333,728 B2 | 5/2016 | Veerasamy |
| 9,341,015 B2 | 5/2016 | Fernando et al. |
| 9,341,909 B2 | 5/2016 | Egerton et al. |
| 9,389,454 B2 | 7/2016 | Yamaguchi et al. |
| 9,400,411 B2 | 7/2016 | Poix et al. |
| 9,436,054 B2 | 9/2016 | Brown et al. |
| 9,436,055 B2 | 9/2016 | Shrivastava et al. |
| 9,442,341 B2 | 9/2016 | Shrivastava et al. |
| 9,477,130 B2 | 10/2016 | Dubrenat et al. |
| 9,494,717 B2 | 11/2016 | Reymond et al. |
| 9,550,457 B2 | 1/2017 | Green et al. |
| 9,568,799 B2 | 2/2017 | Lam et al. |
| 9,581,877 B2 | 2/2017 | Bass et al. |
| 9,606,411 B2 | 3/2017 | Bergh et al. |
| 9,606,412 B2 | 3/2017 | Geerlings et al. |
| 9,618,819 B2 | 4/2017 | Egerton et al. |
| 9,618,820 B2 | 4/2017 | Conklin et al. |
| 9,625,783 B2 | 4/2017 | Bjornard et al. |
| 9,664,976 B2 | 5/2017 | Rozbicki |
| 9,690,162 B2 | 6/2017 | Wilbur et al. |
| 9,726,925 B2 | 8/2017 | Relot et al. |
| 9,766,496 B2 | 9/2017 | Cammenga et al. |
| 9,810,963 B2 | 11/2017 | Gauthier et al. |
| 9,829,763 B2 | 11/2017 | Friedman et al. |
| 9,857,657 B2 | 1/2018 | Ash et al. |
| 9,891,454 B2 | 2/2018 | Zhang et al. |
| 9,927,609 B2 | 3/2018 | Cammenga et al. |
| 9,939,702 B2 | 4/2018 | Bjornard |
| 9,952,481 B2 | 4/2018 | Rozbicki et al. |
| 9,958,750 B2 | 5/2018 | Parker et al. |
| 9,958,751 B2 | 5/2018 | Bergh et al. |

(56) References Cited

U.S. PATENT DOCUMENTS

| | | | |
|---|---|---|---|
| 9,963,383 B2 | 5/2018 | Veerasamy | |
| 9,971,194 B2 | 5/2018 | Brecht et al. | |
| 9,989,822 B2 | 6/2018 | Galstian | |
| 2004/0233379 A1 | 11/2004 | Kinoshita et al. | |
| 2005/0002081 A1 | 1/2005 | Beteille et al. | |
| 2005/0132558 A1 | 6/2005 | Hennessy et al. | |
| 2005/0233125 A1 | 10/2005 | Anderson et al. | |
| 2008/0089073 A1 | 4/2008 | Hikmet | |
| 2008/0317977 A1 | 12/2008 | Wu | |
| 2009/0015068 A1* | 1/2009 | Lee | G09G 3/36 307/31 |
| 2009/0246426 A1 | 10/2009 | Wu | |
| 2009/0279004 A1 | 11/2009 | Greenall et al. | |
| 2009/0303565 A1 | 12/2009 | Karmhag et al. | |
| 2010/0028585 A1 | 2/2010 | Shimatani | |
| 2010/0279125 A1 | 11/2010 | Buyuktanir et al. | |
| 2011/0007253 A1 | 1/2011 | Stocq | |
| 2011/0181820 A1 | 7/2011 | Watanabe | |
| 2012/0086904 A1 | 4/2012 | Oki et al. | |
| 2012/0094118 A1 | 4/2012 | Oki et al. | |
| 2012/0327499 A1 | 12/2012 | Parker et al. | |
| 2013/0107563 A1 | 5/2013 | McCabe et al. | |
| 2013/0118918 A1 | 5/2013 | Servida | |
| 2013/0265511 A1 | 10/2013 | Poix et al. | |
| 2013/0271814 A1 | 10/2013 | Brown | |
| 2014/0020851 A1 | 1/2014 | Ouzts et al. | |
| 2014/0204294 A1 | 7/2014 | Lv | |
| 2014/0211129 A1 | 7/2014 | Bowser et al. | |
| 2014/0247475 A1 | 9/2014 | Parker et al. | |
| 2015/0049270 A1 | 2/2015 | Zhang et al. | |
| 2015/0049378 A1 | 2/2015 | Shrivastava et al. | |
| 2015/0103389 A1 | 4/2015 | Klawuhn et al. | |
| 2015/0116649 A1 | 4/2015 | Watanabe | |
| 2015/0118869 A1 | 4/2015 | Brown et al. | |
| 2015/0151613 A1 | 6/2015 | Weng | |
| 2015/0219975 A1 | 8/2015 | Phillips et al. | |
| 2015/0277165 A1 | 10/2015 | Burrows et al. | |
| 2015/0346575 A1 | 12/2015 | Bhatnagar et al. | |
| 2015/0370140 A1 | 12/2015 | Bertolini | |
| 2015/0378189 A1 | 12/2015 | Kim et al. | |
| 2016/0026061 A1 | 1/2016 | O'Keeffe | |
| 2016/0085129 A1 | 3/2016 | Cammenga et al. | |
| 2016/0085131 A1 | 3/2016 | Lam et al. | |
| 2016/0096344 A1 | 4/2016 | Kurihara | |
| 2016/0124284 A1 | 5/2016 | O'Keeffe | |
| 2016/0138328 A1 | 5/2016 | Behmke et al. | |
| 2016/0161818 A1 | 6/2016 | Gregard et al. | |
| 2016/0187753 A1 | 6/2016 | Sbar et al. | |
| 2016/0189656 A1* | 6/2016 | Park | G09G 3/006 345/694 |
| 2016/0243773 A1 | 8/2016 | Wang | |
| 2016/0312523 A1 | 10/2016 | Miyasaka et al. | |
| 2016/0363831 A1 | 12/2016 | Ash et al. | |
| 2016/0377951 A1 | 12/2016 | Harris | |
| 2017/0028686 A1 | 2/2017 | Wilson et al. | |
| 2017/0122028 A1 | 5/2017 | Suzuka et al. | |
| 2017/0139302 A1 | 5/2017 | Tonar | |
| 2017/0152702 A1 | 6/2017 | Chang et al. | |
| 2017/0218686 A1 | 8/2017 | Galstian | |
| 2017/0219908 A1 | 8/2017 | Brown et al. | |
| 2017/0328121 A1 | 11/2017 | Purdy et al. | |
| 2017/0371218 A1 | 12/2017 | Kailasam et al. | |
| 2018/0007755 A1* | 1/2018 | Murota | H05B 45/10 |
| 2018/0011383 A1 | 1/2018 | Higashihara et al. | |
| 2018/0095337 A1 | 4/2018 | Rozbicki et al. | |
| 2018/0101080 A1 | 4/2018 | Gauthier et al. | |
| 2018/0307111 A1 | 10/2018 | Le Houx et al. | |
| 2019/0018277 A1 | 1/2019 | Berner et al. | |
| 2019/0137796 A1 | 5/2019 | Bjergaard et al. | |
| 2019/0305546 A1* | 10/2019 | Le Cabec | H03K 17/567 |
| 2019/0346710 A1 | 11/2019 | Schleder et al. | |

FOREIGN PATENT DOCUMENTS

| | | |
|---|---|---|
| CN | 203858432 U | 10/2014 |
| CN | 105044965 A | 11/2015 |
| CN | 105334656 A | 2/2016 |
| CN | 205176432 U | 4/2016 |
| CN | 104948080 B | 6/2016 |
| CN | 205297172 U | 6/2016 |
| CN | 205558664 U | 9/2016 |
| CN | 206035269 U | 3/2017 |
| CN | 206352460 U | 7/2017 |
| CN | 107288492 A | 10/2017 |
| CN | 107327250 A | 11/2017 |
| CN | 206737720 U | 12/2017 |
| CN | 206801372 U | 12/2017 |
| CN | 206848627 U | 1/2018 |
| CN | 207004397 U | 2/2018 |
| CN | 108011528 A | 5/2018 |
| EP | 978620 A2 | 2/2000 |
| EP | 2093051 A1 | 8/2009 |
| EP | 2256545 A1 | 12/2010 |
| EP | 2860580 A1 | 4/2015 |
| GB | 2546987 A | 8/2017 |
| JP | S62071930 A | 4/1987 |
| JP | H01202713 A | 8/1989 |
| JP | 2004182484 A | 7/2004 |
| JP | 2017068196 A | 4/2017 |
| KR | 20130037600 A | 4/2013 |
| WO | 2005084378 A2 | 9/2005 |
| WO | 2008090438 A2 | 7/2008 |
| WO | 2010100807 A1 | 9/2010 |
| WO | 2012111715 A1 | 8/2012 |
| WO | 2014032023 A1 | 2/2014 |
| WO | 2015059029 A1 | 4/2015 |
| WO | 2015100419 A1 | 7/2015 |
| WO | 2015117736 A1 | 8/2015 |
| WO | 2016008375 A1 | 1/2016 |
| WO | 2016043164 A1 | 3/2016 |
| WO | 2017008881 A1 | 1/2017 |
| WO | 2017011268 A1 | 1/2017 |
| WO | 2017183692 A1 | 10/2017 |
| WO | 2018086400 A1 | 5/2018 |

OTHER PUBLICATIONS

International Patent Application No. PCT/US2020/017379, International Search Report and Written Opinion dated May 12, 2020, 17 pages.

* cited by examiner

LOW POWER DRIVER FOR PRIVACY GLAZING

CROSS-REFERENCE

This application claims the benefit of U.S. Provisional Patent Application No. 62/802,839, filed Feb. 8, 2019, the entire contents of which are incorporated herein by reference.

TECHNICAL FIELD

This disclosure relates to structures that include an electrically controllable optically active material and, more particularly, to driver configurations for controlling the electrically controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In practice, an electrical driver may be used to control or "drive" the optically active material. The driver may apply or cease applying electrical energy to the optically active material to transition between a transparent state and privacy state, or vice versa. In addition, the driver may apply an electrical signal to the optically active material once transitioned in a particular state to help maintain that state. For example, the driver may apply an electrical signal of alternating polarity to the optically active material to transition the optically active material between states and/or maintain the optically active material in a transitioned state.

During installation of a new privacy structure, a technician may connect a driver intended to drive the privacy structure to a power source. The technician can further connect the driver to the privacy structure itself. The driver can then be permanently mounted adjacent to the privacy structure to control the privacy structure during future operation.

SUMMARY

In general, this disclosure is directed to driver arrangements for controlling privacy structures incorporating an electrically controllable optically active material that provides controllable privacy. The privacy structures can be implemented in the form of a window, door, skylight, interior partition, or yet other structure where controllable visible transmittance is desired. In any case, the privacy structure may be fabricated from multiple panes of transparent material that include an electrically controllable medium between the panes. Each pane of transparent material can carry an electrode layer, which may be implemented as a layer of electrically conductive and optically transparent material deposited over the pane. The optically active material may be controlled, for example via an electrical driver communicatively coupled to the electrode layers, e.g., by controlling the application and/or removal of electrical energy to the optically active material. For example, the driver can control application and/or removal of electrical energy from the optically active material, thereby causing the optically active material to transition from a scattering state in which visibility through the structure is inhibited to a transparent state in which visibility through the structure is comparatively clear.

The electrical driver, which may also be referred to as a controller, may be designed to receive power from a power source, such as a rechargeable and/or replaceable battery and/or wall or mains power source. The electrical driver can condition the electricity received from the power source, e.g., by changing the frequency, amplitude, waveform, and/or other characteristic of the electricity received from the power source. The electrical driver can deliver the conditioned electrical signal to electrodes that are electrically coupled to the optically active material. In some implementations, the driver is capable of receiving a user input or other control information and changing the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

In some examples of the present disclosure, a driver is provided that receives comparatively high supply power from a power source and steps the received power down to a converted power having a converted voltage and a converted apparent power level. The converted power is then deliver to a voltage converter that steps the voltage of the converted power up to an operating voltage suitable for driving the electrically controllable medium, e.g., while further adjusting the apparent power of the converted power down to an operating apparent power level. The operating power having the operating voltage and operating apparent power level can then be conditioned, e.g., by adjusting a frequency, waveform, or other signal characteristic of the power, to produce a drive signal that is supplied to the electrodes bounding the electrically controllable optically active medium.

Configuring a driver for a privacy structure to step received power and voltage levels down to threshold levels followed by subsequently increasing the stepped down voltage back up to an operating voltage can be useful for a variety of reasons. Such a driver can have a power output (e.g., before or after being conditioned) that is lower than the power received from the source (e.g., wall power). As a result, the driver output may be safer for an individual installing the driver and/or a user of the driver system. Moreover, because the power out of the driver may the less than that received from the source, different installation standards may be suitable for the driver and/or associated wiring than if the driver conditioned and output power at a high level. In some applications, for example, the driver and/or wiring extending from the driver to the privacy structure may be enclosed in an inaccessible location (e.g., behind a wall, within a frame surround the privacy structure)

that would not be appropriate if the driver output was at a higher power. As another example, a different type of wiring (e.g., larger gauge wiring corresponding to a thinner diameter) may be used if the output of the driver is lower than would otherwise be required if a high power driver output was provided.

A driver as described herein may be implemented using one or more components physically separated from one another (e.g., in different physical housings) which, in combination, define the driver structure. For example, the driver may include a first housing containing a power converter that steps the power received from a supply down to a converted voltage and a converted apparent power level. This converted power can then be delivered from the first housing to a voltage convertor and/or conditioning circuit (optionally contained together in a second housing) positioned closer to the privacy structure than the first housing. To electrically connect the different components of the driver together, a power supply wire may extend from a power source (e.g., mains or wall power supplied through a circuit breaker) to the first housing containing the power convertor. A second wiring may extend from the first housing to the voltage convertor and/or conditioning circuit (e.g., in the second housing). Further, a third wiring may supply the driver signal produced by the conditioning circuit to the electrodes bounding the electrically controllable optically active material. In some implementations, the power supply wiring may be a thicker diameter (corresponding to a smaller gauge) wiring than the second and third wiring. Additionally or alternatively, the junction between the power supply wiring and the first housing may be accessible (e.g., via a junction box) whereas the junction between the first housing and second wiring and/or the second housing and either or both of the second and third wirings may be inaccessible. This arrangement may be aesthetically desirable because it allows a privacy structure owner to position the access panel for the accessible connection in a visually discrete location while having the remaining connections shrouded under architectural/building elements.

In one example, an electrically dynamic system is described. The system includes a first pane of transparent material, a second pane of transparent material, and an electrically controllable optically active material positioned between the first pane of transparent material and the second pane of transparent material. The electrically controllable optically active material is positioned between a first electrode layer and a second electrode layer. The system also includes a driver electrically connected to the first electrode layer and the second electrode layer. The driver is configured to electrically connect to a power source that provides power at a supply voltage and a supply apparent power level and convert power received from the power source down to a converted voltage and a converted apparent power level. The converted voltage is less than the supply voltage and the converted apparent power level is less than the supply apparent power level. The driver is also configured to deliver power at the converted voltage and the converted apparent power level to a voltage convertor. The driver is configured to increase the converted voltage to an operating voltage at the voltage convertor, thereby providing power from the voltage convertor at the operating voltage and having an operating apparent power level. The example specifies that the driver is configured to condition power received from the voltage convertor having the operating voltage and operating apparent power level to provide a drive signal and further provide the drive signal to the first electrode layer and the second electrode layer for controlling the electrically controllable optically active material.

In another example, a driver for an electrically dynamic glazing system is described. The driver includes a power convertor configured to electrically connect to a power source that provides power at a supply voltage and a supply apparent power level and convert power received from the power source down to a converted voltage and a converted apparent power level. The converted voltage is less than the supply voltage and the converted apparent power level is less than the supply apparent power level. The driver further includes a voltage convertor configured to receive power at the converted voltage and the converted apparent power level and increase the converted voltage to an operating voltage, thereby providing power from the voltage convertor at the operating voltage and having an operating apparent power level. The example driver further includes a conditioning circuit configured to condition power received from the voltage convertor having the operating voltage and operating apparent power level to provide a drive signal for supply to a first electrode layer and a second electrode layer between which is positioned an electrically controllable optically active material.

The details of one or more examples are set forth in the accompanying drawings and the description below. Other features, objects, and advantages will be apparent from the description and drawings, and from the claims.

DETAILED DESCRIPTION

In general, the present disclosure is directed to electrical control systems, devices, and method for controlling optical structures having controllable light modulation. For example, an optical structure may include an electrically controllable optically active material that provides controlled transition between a privacy or scattering state and a visible or transmittance state. An electrical controller, also referred to as a driver, may be electrically coupled to optically active material through electrode layers bounding the optically active material. The electrical driver may receive power from a power source and condition the electricity received from the power source, e.g., by changing the frequency, amplitude, waveform, and/or other characteristic of the electricity received from the power source. The electrical driver can deliver the conditioned electrical signal to the electrodes. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

In some implementations discussed in greater detail below, a driver according to the disclosure may receive power from a source and step the received power down to a converted apparent power level less than the apparent power level of the receive supply. The driver may also step the voltage of the supply power down to a converted voltage less than that of supply. This provides a lower power supply for transfer to other components of the driver and/or delivery to the privacy structure. For example, the driver may take the converted power (e.g., characterized by a converted apparent power level and a converted voltage) and step the voltage backup to an operating voltage. This can provide an operating power (e.g., characterized by an operating apparent power level and an operating voltage). Conditioning circuitry can receive and condition the operating power to generate a drive signal that is then supplied to the electrode layers bounding the electrically controllable optically active material of the privacy structure.

Figure 1:
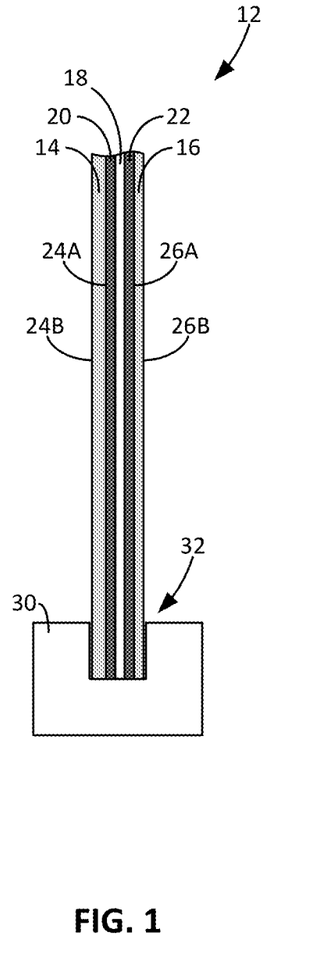
FIG. 1 is a side view of an example privacy structure.

FIG. 1 is a side view of an example privacy glazing structure 12 that includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 via a driver as described herein can control the optically active material 18 to control visibility through the privacy glazing structure.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly scattered. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but opaque and scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 18 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be blocked. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety of factors, including the specific type of material selected for optically active material 18, the temperature of the material, the electrical voltage applied to the material, and the like.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. For example, first pane of transparent material 14 may define an inner surface 24A and an outer surface 24B on an opposite side of the pane. Similarly, second pane of transparent material 16 may define an inner surface 26A and an outer surface 26B on an opposite side of the pane. First electrode layer 20 can be deposited over the inner surface 24A of the first pane, while second electrode layer 22 can be deposited over the inner surface 26A of the second pane. The first and second electrode layers 20, 22 can be deposited directed on the inner surface of a respective pane or one or more intermediate layers, such as a blocker layer, and be deposited between the inner surface of the pane and the electrode layer.

Each electrode layer 20, 22 may be an electrically conductive coating that is a transparent conductive oxide ("TCO") coating, such as aluminum-doped zinc oxide and/or tin-doped indium oxide. The transparent conductive oxide coatings can be electrically connected to a power source through notch structures as described in greater detail below. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride). In either case, first pane of transparent material 14 and second pane of transparent material 16, as well as any coatings on inner faces 24A, 26A of the panes can form a cavity or chamber containing optically active material 18.

The panes of transparent material forming privacy glazing structure 12, including first pane 14 and second pane 16, and be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 14 and/or second pane 16 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in US Patent Publication No. 2018/0307111, titled "HIGH PERFORMANCE PRIVACY GLAZING STRUCTURES" and filed Apr. 20, 2018, the entire contents of which are incorporated herein by reference.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame 30 surrounding the exterior perimeter of the structure. In different examples, frame 30 may be fabricated from wood, metal, or a plastic material such a vinyl. Frame 30 may defines a channel 32 that receives and holds the external perimeter edge of structure 12. The sightline through privacy glazing structure 12 is generally established as the location where frame 30 ends and visibility through privacy glazing structure 12 begins.

Figure 2:
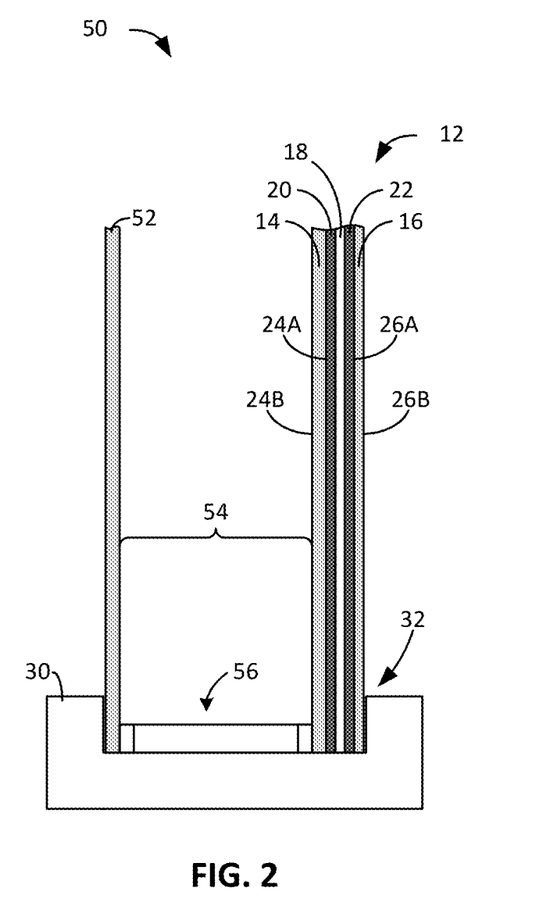
FIG. 2 is a side view of the example privacy structure of FIG. 1 incorporated into a multi-pane insulating glazing unit.

In the example of FIG. 1, privacy glazing structure 12 is illustrated as a privacy cell formed of two panes of transparent material bounding optically active material 18. In other configurations, privacy glazing structure 12 may be incorporated into a multi-pane glazing structure that include a privacy cell having one or more additional panes separated by one or more between-pane spaces. FIG. 2 is a side view of an example configuration in which privacy glazing structure 12 from FIG. 1 is incorporated into a multi-pane insulating glazing unit having a between-pane space.

As shown in the illustrated example of FIG. 2, a multi-pane privacy glazing structure 50 may include privacy glazing structure 12 separated from an additional (e.g., third) pane of transparent material 52 by a between-pane space 54, for example, by a spacer 56. Spacer 56 may extend around the entire perimeter of multi-pane privacy glazing structure 50 to hermetically seal the between-pane space 54 from gas exchange with a surrounding environment. To minimize thermal exchange across multi-pane privacy glazing structure 50, between-pane space 54 can be filled with an insulative gas or even evacuated of gas. For example, between-pane space 54 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 54 may be evacuated so that the between-pane space is at vacuum pressure relative to the pressure of an environment surrounding multi-pane privacy glazing structure 50.

Spacer 56 can be any structure that holds opposed substrates in a spaced apart relationship over the service life of multi-pane privacy glazing structure 50 and seals between-pane space 54 between the opposed panes of material, e.g., so as to inhibit or eliminate gas exchange between the between-pane space and an environment surrounding the unit. One example of a spacer that can be used as spacer 56 is a tubular spacer positioned between first pane of transparent material 14 and third pane of transparent material 52. The tubular spacer may define a hollow lumen or tube which, in some examples, is filled with desiccant. The tubular spacer may have a first side surface adhered (by a first bead of sealant) to the outer surface 24B of first pane of transparent material 14 and a second side surface adhered (by a second bead of sealant) to third pane of transparent material 52. A top surface of the tubular spacer can exposed to between-pane space 54 and, in some examples, includes openings that allow gas within the between-pane space to communicate with desiccating material inside of the spacer. Such a spacer can be fabricated from aluminum, stainless steel, a thermoplastic, or any other suitable material.

Another example of a spacer that can be used as spacer 56 is a spacer formed from a corrugated metal reinforcing sheet surrounded by a sealant composition. The corrugated metal reinforcing sheet may be a rigid structural component that holds first pane of transparent material 14 apart from third pane of transparent material 52. In yet another example, spacer 56 may be formed from a foam material surrounded on all sides except a side facing a between-pane space with a metal foil. As another example, spacer 56 may be a thermoplastic spacer (TPS) spacer formed by positioning a primary sealant (e.g., adhesive) between first pane of transparent material 14 and third pane of transparent material 52 followed, optionally, by a secondary sealant applied around the perimeter defined between the substrates and the primary sealant. Spacer 56 can have other configurations, as will be appreciated by those of ordinary skill in the art.

Depending on application, first patent of transparent material 14, second pane of transparent material 16, and/or third pane of transparent material 52 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. A photocatalytic coating, by contrast, may be a coating that includes a photocatalyst, such as titanium dioxide. In use, the photocatalyst may exhibit photoactivity that can help self-clean, or provide less maintenance for, the panes.

The electrode layers 20, 22 of privacy glazing structure 12, whether implemented alone or in the form of multiple-pane structure with a between-pane space, can be electrically connected to a driver. The driver can provide a drive signal to the electrode layers, which may be electrical signal of a define current, voltage, and waveform to control optically active material 18.

Figure 3:
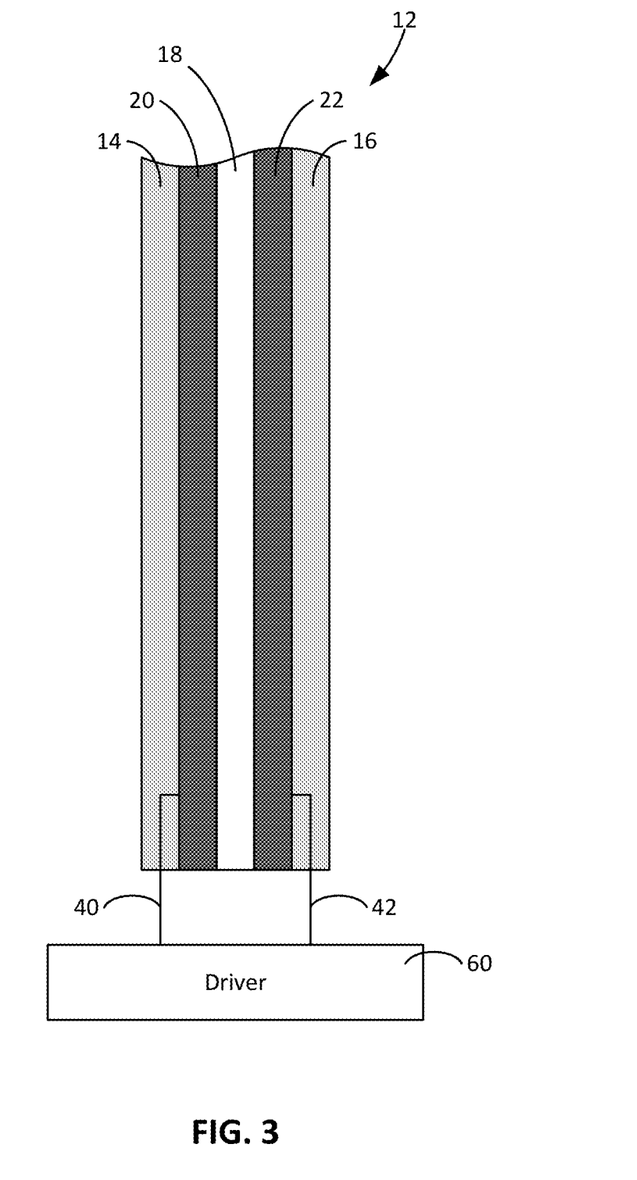
FIG. 3 is a schematic illustration showing an example connection arrangement of a driver to electrode layers of the privacy structure of FIG. 1.

FIG. 3 is a schematic illustration showing an example connection arrangement between a driver and electrode layers of a privacy structure. In the illustrated example, wires 40 and 42 electrically couple driver 60 to the first electrode layer 20 and the second electrode layer 22, respectively. In some examples, wire 40 and/or wire 42 may connect to their respective electrode layers via a conduit or hole in the transparent pane adjacent the electrode layer. In other configurations, wire 40 and/or wire 42 may contact their respective electrode layers at the edge of the privacy structure 12 without requiring wire 40 and/or wire 42 to extend through other sections (e.g., transparent panes 14, 16) to reach the respective electrode layer(s). In either case, driver 60 may be electrically coupled to each of electrode layers 20 and 22.

In operation, the driver 60 can apply a voltage difference between electrode layers 20 and 22, resulting in an electric field across optically active material 18. The optical properties of the optically active material 18 can be adjusted by applying a voltage across the layer. In some embodiments, the effect of the voltage on the optically active material 18 is independent of the polarity of the applied voltage. For example, in some examples in which optically active material 18 comprises liquid crystals that align with an electric field between electrode layers 20 and 22, the optical result of the crystal alignment is independent of the polarity of the electric field. For instance, liquid crystals may align with an electric field in a first polarity, and may rotate approximately 180° in the event the polarity if reversed. However, the optical state of the liquid crystals (e.g., the opacity) in either orientation may be approximately the same.

Figure 4:
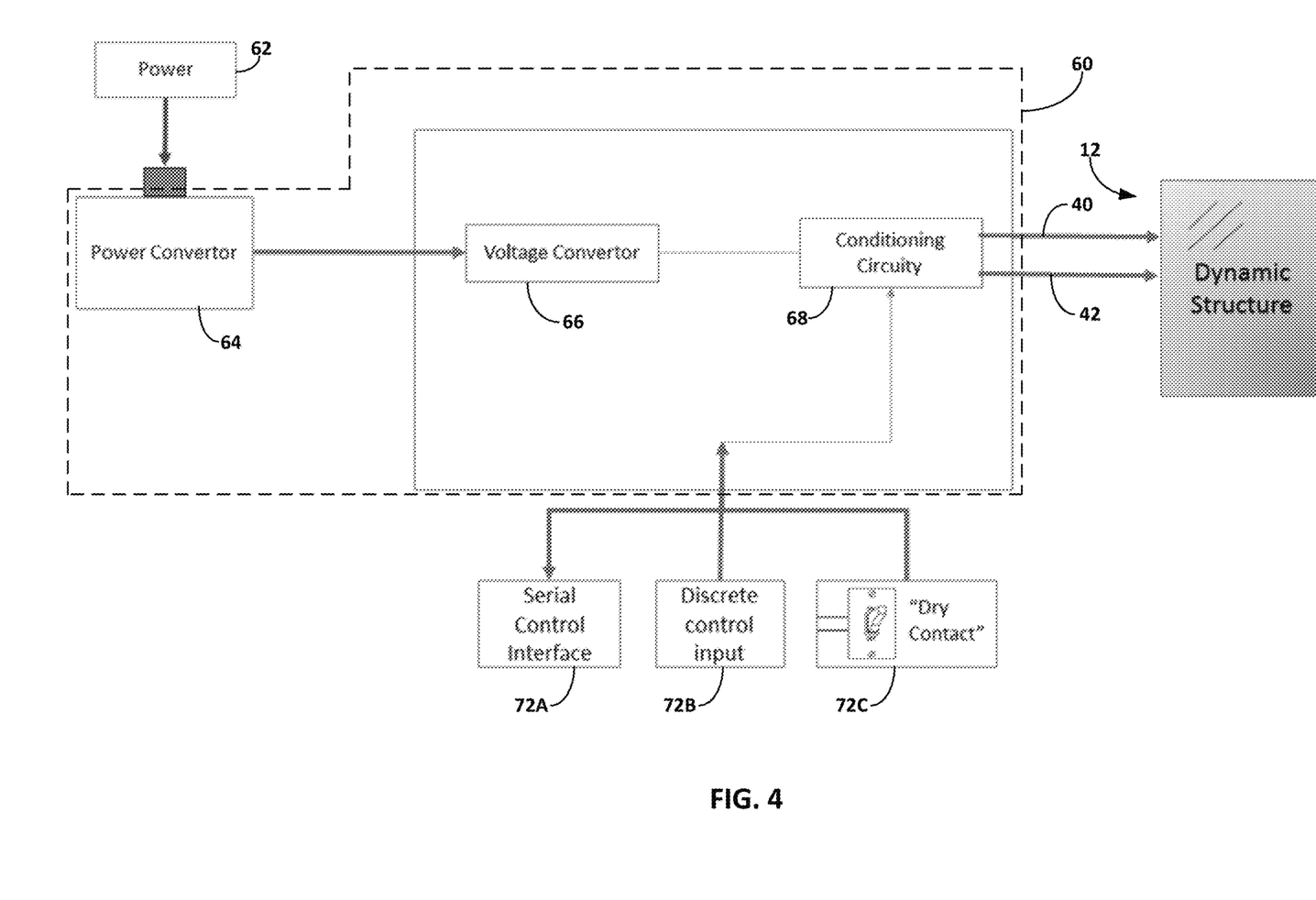
FIG. 4 is a block diagram of an example driver layout that can be used with the example privacy structure of FIG. 1.

FIG. 4 is a block diagram illustrating an electrical dynamic structure system that includes privacy glazing structure 12, driver 60, and a power source 62. Driver 60 receives power from power source 62 and processes the power to provide a drive signal delivered to privacy structure 12 via wires 40, 42. In the illustrated example, driver 60 is illustrated as including a power converter 64, a voltage converter 66, and conditioning circuitry 68. In some implementations, driver 60 receives one or more control signals from one or more controls 72, which in the illustrated example is shown as including a first control 72A, a second control 72B, and a third control 72C. Driver 60 processes and conditions the power received from power source 62 to supply a drive signal to privacy structure 12.

In general, power source 62 may be implemented using any suitable source that supplies electrical energy to driver 60. In various examples, power source 62 may be implemented as a rechargeable and/or replaceable battery or as wall power (also referred to as mains power), that can be generated by an onsite or offsite generator (e.g., power plant) and supplied through a power distribution network. Power source 62 may supply alternating current (AC) to driver 60, which is a type of current in which the direction of the flow of electrons (polarity) switches back and forth at regular cycles. In the United States, a typical frequency for wall power is 60 hertz (Hz). By contrast, Europe and many other parts of the world use power having a frequency of 50 Hz. Accordingly, in different applications, power source 62 may deliver alternating current electricity at a frequency falling with a range from 35 Hz to 75 Hz, such as 45 Hz to 65 Hz, or from 50 Hz to 60 Hz.

The electricity delivered by power source 62 to driver 60 can be characterized by various attributes, such as the voltage of the electricity and apparent power of the electricity. Apparent power is a combination of reactive power and true power, and is typically considered the product of the circuit's voltage and current, without reference to phase angle. More specifically, apparent power can be calculated by multiplying the root mean square current by the root mean square voltage and can be measured in units of volt-amps (VA).

The characteristics of the electricity delivered by power source 62 can vary depending on the application and the specific source of power used. In some applications, power source 62 delivers electricity at a voltage ranging from 50 V to 500 V, such as from 100 V to 250 V, or from 110 V to 130 V. For example, power source 62 may supply electricity at a voltage of approximately 120 V (e.g., plus or minus 5%). The apparent power supplied by power source 62 is a function of both the voltage and current of the electricity delivered to driver 60. In some examples, power source 62 delivers electricity having apparent power ranging from 1000 VA to 5000 VA, such as from 1500 VA to 2500 VA. For example, driver 60 may receive power from power source 62 having an apparent power of at least 1500 VA, such as at least 1650 VA, or at least 1750 VA. Because power source 62 supplies electricity to driver 60 that is then processed to produce a drive signal for privacy structure 12, any of the foregoing voltages and apparent power levels described as being provided by power source 62 may be referred to as supply voltages and supply apparent power levels, respectively.

Driver 60 in the example of FIG. 4 is configured to receive power from power source 62 and convert the received power down to a converted power. To convert the supply power received from power source 62 down to a converted power, driver 60 may include a power converter 64. Power converter 64 can be implemented using a transformer, a capacitor, an inductor, and/or other hardware component capable of reducing the voltage and apparent power level of the received supply power. For instance, in one specific example, power converter 64 can be implemented using a transformer.

Power convertor 64 can convert the power received from power source 62 down to a converted power characterized by a converted voltage and a converted apparent power level. In some examples, the converted voltage is less than the supply voltage and the converted apparent power level is less than the supply apparent power level. When so implemented, power converter 64 steps down the voltage and apparent power level of the received supply power to generate the converted power. The specific voltage and apparent power level to which power converter 64 reduces the received supply power down to may vary, e.g., depending on the operational needs of downstream components and/or the installation requirements of certain desired downstream components. For example, power converter 64 may reduce the supply power down to a level that is suitable to use hardware and installation techniques associated with comparatively low power systems but that would not be suitable if operating with the power supply directly from power source 62.

In some examples, power converter 64 reduces the power received from power source 62 down to a converted voltage less than 120 V, such as less than 100 V, less than 75 V, or less than 60 V. For example, power converter 64 may reduce the power received from power source 62 down to converted voltage ranging from 100 V to 5 V, such as from 75 V to 10 V, or from 60 V to 25 V. Power converter 64 may also reduce the apparent power level of the supply power down to an apparent power level less than or equal to 150 VA, such as less than or equal to 100 VA, or less than or equal to 80 VA.

In the arrangement of driver 60 of FIG. 4, the converted power produced by power converter 64 is supplied to voltage converter 66. Voltage converter 66 may be implemented using a transformer, a capacitor, an inductor, and/or other hardware component capable of increasing the voltage of the received converted power. For instance, in one specific example, voltage convertor 66 can be implemented using a capacitor.

Voltage converter 66 can step the voltage of the power received from power converter 64 up to an operating voltage. For example, voltage converter 66 can receive power from power converter 64 and increase the voltage of the received power to an operating voltage greater than the converted voltage, which correspondingly may cause the apparent power level of the operating power provided by the voltage converter to be reduced to a level less than the converted apparent power level. Increasing the voltage of the received converted power may be useful to provide a drive signal for driving privacy structure 12 that is at a voltage (e.g., operating voltage) higher than the converted voltage. For instance, the electrically controllable optically active material in privacy structure 12 may desirably be driven via a drive signal at a voltage higher than the converted voltage. For this or other reasons, the converted voltage received by voltage converter 66 may be stepped up to a higher voltage to provide an operating voltage.

Thus, in some configurations, driver 60 may take power supplied by power source 62, reduce the supply voltage of the power supply down to a converted voltage less than the supply voltage and then subsequently increase the converted voltage up to an operating voltage (e.g., which may be higher than the converted voltage but less than the supply voltage). Reducing the supply voltage down to a converted voltage before subsequently increasing the converted voltage up to the supply voltage may be useful, for example, to facilitate the use of comparatively low power hardware and/or installation techniques which may not otherwise be suitable if delivering power directly from power source 62 to conditioning circuitry 68. For example, as will be discussed in greater detail below, the components that collectively form driver 60 may be implemented in one, two, or more physically separate locations, structures, and/or housings. When implemented in multiple physically separate locations, hardware features and/or installation techniques suitable for low-power applications may be used between power converter 64 and voltage converter 66, for example.

With further reference to FIG. 4, driver 60 also includes conditioning circuitry 68. In general, conditioning circuitry 68 can be implemented using one or more hardware and/or software components that condition the power received from voltage converter 66 to produce a drive signal for delivery to privacy structure 12. Example circuit elements that may be included in conditioning circuitry 68 include one or more switches, one or more inductive storage elements, one or more capacitive storage elements, one or more controllers, and/or other circuit elements appropriate to perform the functions attributed to conditioning circuitry 68 herein. For example, conditioning circuitry 68 may include a controller that receives one or more control signals from control circuitry and conditions the operating power received from voltage converter 66 based on the signal information. Conditioning circuitry 68 may condition the electricity received from voltage converter 66, e.g., by changing the frequency, amplitude, waveform (e.g., shape of the signal), and/or other characteristic of the electricity received. In some examples, conditioning circuitry 68 conditions the operating power received from voltage converter 66 without significantly changing the operating voltage (amplitude) of the signal, e.g., such that the drive signal provided to privacy structure 12 is at the operating voltage set by voltage converter 66. One example configuration of conditioning circuitry 68 is described in U.S. Provisional Patent Application No. 62/669,005, titled "ELECTRICALLY CONTROLLABLE PRIVACY GLAZING WITH ENERGY RECAPTURING DRIVER," filed May 9, 2018, the entire contents of which are incorporated herein by reference.

Conditioning circuitry 68 can deliver a drive signal to privacy structure 12. For example, the electrical signal produced by conditioning circuitry 68 can leave driver 60 and be delivered to electrode layers 20 and 22, respectively, of privacy structure 12 for controlling the electrically controllable optically active material positioned between the layers.

In implementations where driver 60 (e.g., conditioning circuitry 68 of the driver) includes a controller, the controller can include one or more components configured to process received information, such as a received input from a user interface, and perform one or more corresponding actions in response thereto. Such components can include, for example, one or more application specific integrated circuits (ASICs), microcontrollers, microprocessors, field-programmable gate arrays (FPGAs), or other appropriate components capable of receiving and output data and/or signals according to a predefined relationship. In some examples, such one or more components can be physically integrated with the other driver components, such as a switching network and the like.

In some examples, the controller operates in response to a signal from one or more controls 72 that function as a user interface with the controller. The one or more controls 72 may provide a command to change the optical state of the optically active material. In various examples, the one or more controls 72 can be a switch or other component in wired or wireless communication with the controller. For instance, a hard switch (e.g., a wall switch proximate an optically dynamic structure) can be coupled to the controller and can switch between two or more switching states, each corresponding to an optical state of the optically active material. Additionally or alternatively, the driver may be configured to communicate with an external component, such as a smartphone or tablet via wireless communication or an internet-connected device (e.g., through a hard-wired or wireless network connection). In some implementations, the controller can receive a signal from such an external device corresponding to a desired optical state of the optically active material and can control the optically active material accordingly, e.g., to transition to that state.

Figure 5:
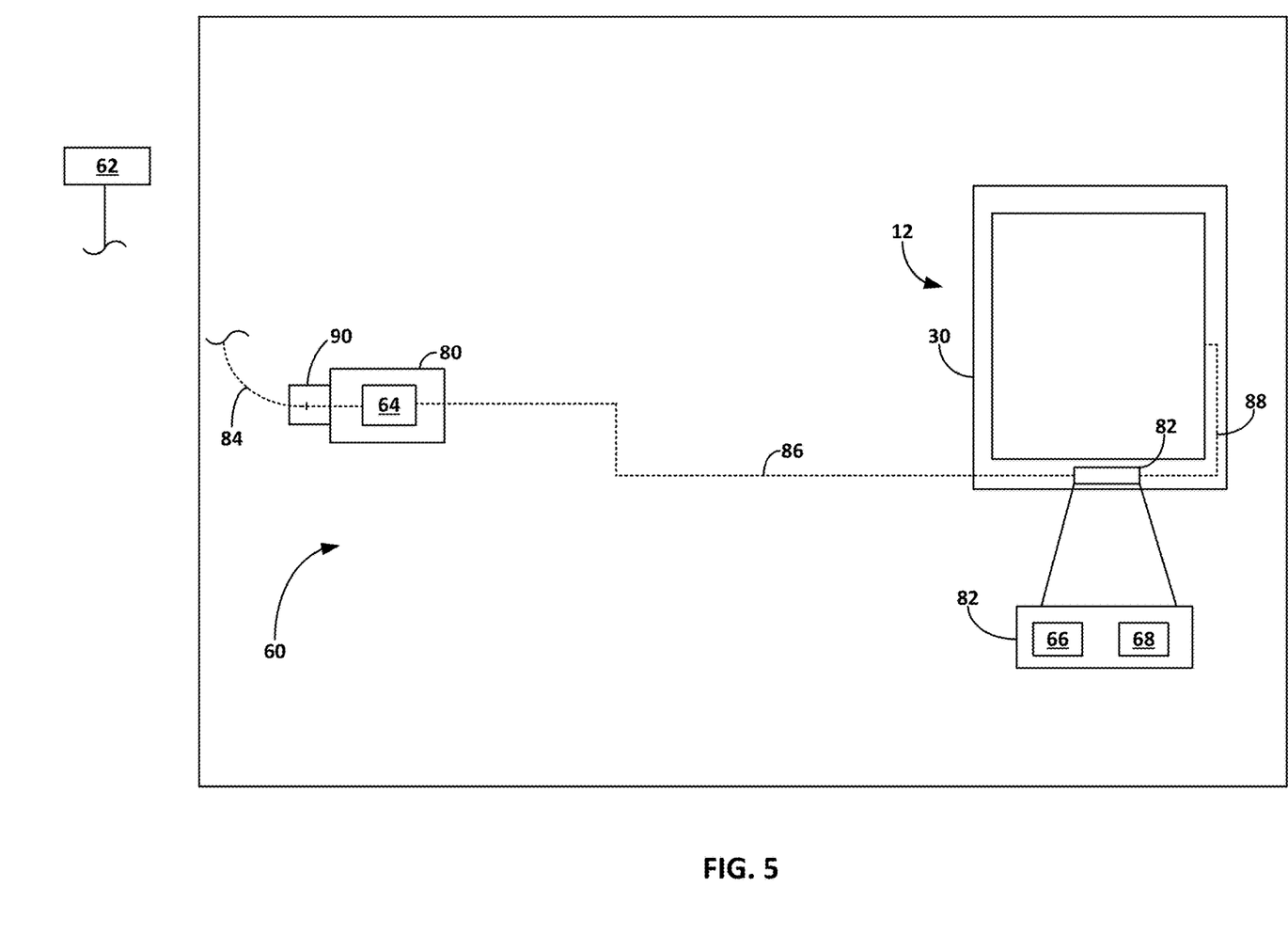
FIG. 5 is an illustration showing an example arrangement of the driver of FIG. 4 with the example privacy structure of FIG. 1.

As briefly mentioned above, the various components of driver 60 may be implemented using one or more components physically separated from one another (e.g., in different physical housings) which, in combination, define the driver structure. FIG. 5 is an illustration of an example arrangement of driver components that can be used in an electrically dynamic system according to the disclosure where the features of driver 60 are divided into at least two physically separate housings.

In the example of FIG. 5, driver 60 is illustrated as including a first housing 80 and a second housing 82. First and second housings 80, 82 may be partially or fully enclosed cavities (e.g., formed of plastic and/or metal) containing one or more components of driver 60. In the illustrated example, first housing 80 contains power converter 64 and second housing 82 contains voltage converter 66 and conditioning circuitry 68. First housing 80 is physically spaced apart from second housing 82 a separation distance in the illustrated example.

An electrically conductive member (e.g., wiring) may be used to electrically connect the different components of driver 60 together, including power converter 64 in first housing 80 and voltage converter 66 in second housing 82. When driver 60 is implemented using multiple physically separate housings, a first wiring 84 may be provided that extends from power source 62 to first housing 80. First wiring 84 can deliver the supply power from power source 62 to the power convertor 64 contained within housing 80. A second wiring 86 may be provided extending from first housing 80 to second housing 82. Second wiring 86 can electrically connect power converter 64 in first housing 80 to voltage convertor 66 and second housing 82. Second wiring 86 can deliver the converted power from power converter 64 to the voltage convertor 66. A third wiring 88 (which was illustrated in FIG. 4 as being implemented with wiring 40, 42) can extend from second housing 82 to privacy structure 12 and, more particularly, electrode layers 20 and 22 of the privacy structure. Third wiring 88 can electrically connect conditioning circuitry 68 in second housing 82 to the electrode layers of the privacy structure. Third wiring 88 can deliver a drive signal from conditioning circuitry 68 to the privacy structure.

Although driver 60 in the example of FIG. 5 is illustrated as being implemented using two physically separate housings, a driver according to the disclosure may be implemented using fewer or more physically separate structures/components, and the disclosure is not limited in this respect unless otherwise noted. For example, in alternative configurations, the components of driver 60 may be implemented within a single housing. When so configured, a first wiring 84 may extend from power source 62 to the single housing, and a second wiring 86 may extend from the housing to the privacy structure 12 to deliver the drive signal to the privacy structure. As yet a further alternative configuration, the components forming driver 60 may be divided into three or more physically separate housings, e.g., each interconnected with electrically conductive members.

In general, the term wiring used herein refers to an electrically conductive member (which is optionally flexible under hand pressure), such as a thread of metal optionally covered with an insulative coating, a flexible printed circuit, or other electrical connector facilitating electrical connection. One example type of wiring that may be used is a non-metallic sheathed cable that includes two or more insulated conductors contained in a non-metallic sheath (e.g., polymeric sheath). For example, the non-metallic sheathed cable may include two or three metallic conductors (e.g., copper wires) each individually covered with an insulative polymeric material and all contained within a non-metallic sheath, optionally along with a ground wire (e.g., bare metal copper wire). Each metallic conductor may be formed of a single core of metal or may be formed of multiple cores of metal positioned in contact with each other. When the wiring includes multiple cores, the gauge or thickness of the wire may be determined by the combined thickness of the multiple cores. It should be appreciated that features described as wiring herein may be implemented using one or multiple individual segments of wiring (e.g., joined together) and need not be implemented using a single, continuous section of wiring. Further, it should be appreciated that features described as being within a common housing (e.g., voltage converter 66 and conditioning circuitry 68) may be electrically connected using any suitable electrical connection, such as flexible wiring, one or more printed traces on a circuit board, or other suitable electrical conductor.

In accordance with some examples of the present disclosure, different types of wiring may be used to electrically connect the different components of driver 60 together and/or connect the driver to power source 62 and privacy structure 12. For example, first wiring 84 that delivers supply power from power source 62 to power converter 64 may be of a first thickness while second wiring 86 may be of a second thickness and third wiring 88 may be of a third thickness. The first thickness (e.g., diameter) of first wiring 84 may be greater (e.g., corresponding to a lower gauge) than the second thickness of second wiring 86 and the third thickness of third wiring 88.

Configuring driver 60 with power converter 64 to reduce the incoming supply power from power source 62 down to a converted power less than the supply power may facilitate the use of different types of wiring and/or connection arrangements between components. For example, in some implementations, first wiring 84 may be implemented using wiring of 14 gauge or less (e.g., corresponding to a thickness of approximately 1.6 mm or greater). By contrast, second wiring 86 and/or third wiring 88 may be implemented using wiring of a higher gauge, such as 18 gauge wiring or greater (e.g., corresponding to a thickness of approximately 1 mm or less). The thickness of second wiring 86 and third wiring 88 may be the same as each other or, in other examples, may be different than each other. In some applications, first wiring 84 may use single core metallic conductors whereas second wiring 86 and/or third wiring 88 may use metallic conductors with multiple cores. In one example implementation, first wiring 84 is compliant with the United States National Fire Protection Association's 2017 National Electrical Code Class I wiring requirements. In this example, the second wiring 86 and third wiring 88 may be compliant with the United States National Fire Protection Association's 2017 National Electrical Code Class II wiring requirements.

Depending on the installation licensure requirements of the location where the electrically dynamic system is being installed, installers having different electrical licensing credentials may be used to install different components of the system. For example, a first installer (e.g., holding an electrician's license from a governing body covering the location where the electrically dynamic system is being installed) may install first wiring 84 in first housing 80 containing power converter 64 of driver 60. This first installer may electrically connect power source 62 to the power convertor 64. Subsequently (e.g., at that same or a different time), a second installer different than the first installer may install second wiring 86, second housing 82 of driver 60, and/or third wiring 88. The second installer may or may not hold an electrician's license from the governing body covering the location where the electrically dynamic system is being installed. In this way, configuring driver 60 to provide a converted power may facilitate the division of installation tasks between different installers having different levels of experience and/or licensure. That being said, in other applications, a single installer may install all components of the system.

When driver 60 is implemented using two or more physically separate components (e.g., first housing 80 and second housing 82), the components may be physically spaced from each other during installation. This may be particularly useful for applications where visual appearance of the installed system is important for the end user and shrouding or masking of control components of the system is desired. In practice, a connection between the first housing 80 (and/or power converter 64 contained in the housing) and first wiring 84 may need to be accessible to provide access to the electrical connection (e.g., for service, safety, etc.) during subsequent use. By contrast, the connections between second wiring 86 and first housing 80 and/or second housing 82 (and/or the components within the respective housings) may or may not be accessible. Similarly, the connection between third wiring 88 and second housing 82 (and/or the components within the housing) may or may not be accessible.

As used herein, the term "accessible" means (1) the connection is capable of being removed or exposed without damaging building structure or finish enclosing the connection and (2) the connection is not permanently closed in by the structure or finish of the building. For example, a connection is considered permanently closed in, and therefore inaccessible, if the connection is contained behind drywall, wood paneling, or other structural material without an access panel such that the physical structure of the structural material would need to be altered, damaged, or detached from a surface to which it is engaged in order to access or remove the connection. By contrast, a connection that is made within an electrical junction box would be considered accessible. Such a connection would be accessible through a wall surface or access panel thereof (e.g., by removing access panel covering the junction box to provide access to the junction box position behind the wall surface, such as drywall surface).

In the example of FIG. 5, the electrical connection between first wiring 84 in first housing 80 (power converter 64 in the housing) is shown as being configured to be accessible, with the connection being made in a junction box 90 that forms part of or is adjacent to (but optionally physically separate from) first housing 80. Such junction box may include a cover that is removable for accessing the connection. In the example of FIG. 5, the connections between second wiring 86 and first housing 80 and second housing 82 (and the respective components contained in each housing) are shown as inaccessible. Further, the connection between third wiring 88 and second housing 82 (and the components contained in the housing) are also shown as inaccessible. These inaccessible connections may be positioned behind drywall, trim, or other structural material.

In some applications, second housing 82 is positioned at or on privacy structure 12. For example, second housing 82 (and/or the components therein) may be positioned in adjacent proximity to privacy structure 12, such as within 1 foot of a nearest surface of the structure, or within 6 inches of the nearest surface of the structure.

In one implementation, second housing 82 is positioned in the frame 30 of privacy structure 12, with the connections between second wiring 86 and third wiring 88 also located within the frame. When so configured, the connections may be inaccessible within the meaning of the present application. To access the connections, a user need may need to remove a portion of frame 30 (e.g., a portion of trim surrounding the frame) to access second housing 82. For example, decorative trim may surround frame 30 and be nailed or otherwise secured around the perimeter of the frame (e.g., to drywall surrounding the frame). The decorative trim may need to be pried away from the perimeter of the frame to access second housing 82. Such an arrangement would be considered inaccessible within the meaning of the present application.

In some configurations, first housing 80 of driver 60 is located a distance away from second housing 82 and/or privacy structure 12. This can position the first housing 80 and, when configured with an associated junction box 90, a cover panel for the junction box a distance away from privacy structure 12 which may be aesthetically desirable for the end user. The distance first housing 80 is positioned away from privacy structure 12 may depend on the configuration of the system and the environment in which it is installed. In some examples, second wiring 86 and third wiring 88 have a combined length of at least 2 feet, such as at least 3 feet, at least 5 feet, at least 7 feet, or at least 10 feet. For example, second wiring 86 and third wiring 88 may have a combined length ranging from 2 feet to 25 feet, such as from 2 feet to 15 feet. The combined length of second wiring 86 and third wiring 88 may establish the distance that first housing 80 is spaced away from privacy structure 12.

Figure 6:
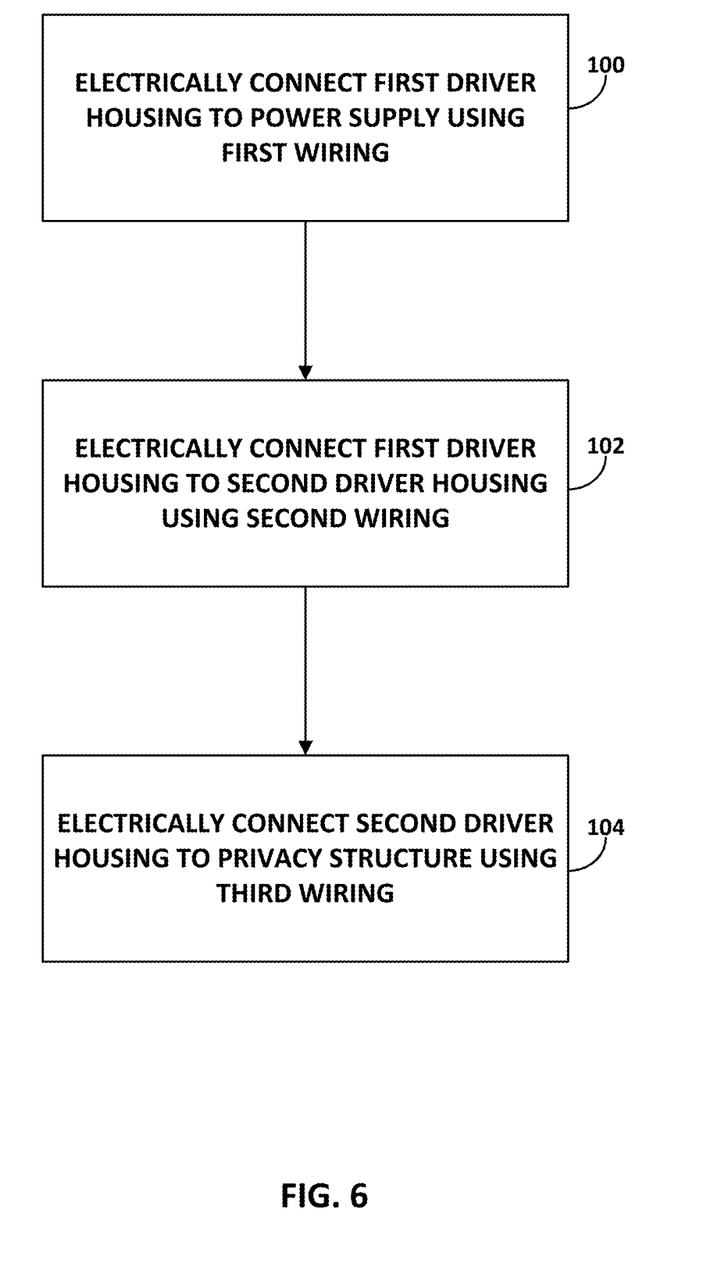
FIG. 6 is a flow diagram illustrating an example method for electrically connecting a privacy structure.

FIG. 6 is a flow diagram illustrating an example method for electrically connecting a privacy structure to a power source. The technique of FIG. 6 will be described with respect to privacy structure 12 (FIGS. 1 and 2) and driver 60 (FIGS. 4 and 5) although can be implemented with other component configurations, as described herein. The example technique of FIG. 6 involves electrically connecting a first wiring 84 from power source 62 to first housing 80 and the components contained therein, such as power converter 64 (100). First wiring may be selected as a type of wiring suitable to deliver the power supplied by power source 62. For example, first wiring 84 may be a non-metallic sheathed cable including two or three metallic conductors (e.g., copper wires) each individually covered with an insulative polymeric material. Each of the metallic conductors may have a single core.

First wiring 84 may be electrically connected to power converter 64 in first housing 80 via a junction box 90. A comparatively short section of wiring may extend from first housing 80, which may be referred to as a pigtail or whip, and enter junction box 90. Terminal ends of the wiring originating from first housing 80 (which are electrically coupled to power converter 64) may be physically joined to terminal ends of first wiring 84 inside of junction box 90. Junction box 90 may be closed by an access panel, which may be removable. Accordingly, the connection between the first wiring 84 and power converter 64 may be deemed accessible. The remaining length of first wiring 84 may extend behind a wall surface, such as running through wire routing openings in studs that are covered by drywall or other surfacing material. First wiring 84 may extend back to a central circuit breaker box which, in turn, may be connected to a central electrical supply line.

The technique of FIG. 6 also includes electrically connecting first housing 80 of driver 60 to second housing 82 of the driver using a second wiring 86 (102). Second wiring 86 may be electrically connected to first housing 80 (and, more specifically, power converter 64 in the housing). In some examples, a second short section of wiring extends from housing 80 to provide a connection location between the first housing and second wiring 86. Alternatively, first housing 80 and second wiring 86 may have complementary male/female electrical connection and engagement features that mate with each other to establish an electrical connection. In either case, the electrical connection between the first housing 80 and second wiring 86 may be established. In some examples, the connection between first housing 80 and second wiring 86 may be made and the connection then made inaccessible. The connection may be covered or otherwise obscured such that the connection is not accessible.

The opposite end of second wiring 86 can be connected to second housing 82 of driver 60 (and, more specifically, voltage converter 66 and conditioning circuitry 68 in the second housing). Similarly, a short section of wiring may extend from second housing 82 to provide a connection location between the second housing and second wiring 86. Alternatively, second housing 82 and second wiring 86 may have complementary male/female electrical connection and engagement features that mate with each other to establish an electrical connection. In either case, the electrical connection between the second housing 82 and second wiring 86 may be established. In some examples, the connection between second housing 82 and second wiring 86 may be made and the connection then made inaccessible. The connection may be covered or otherwise obscured such that connection is not accessible. The length of second wiring 86 from first housing 80 to second housing 82 may extend behind a wall surface, such as running through wire routing openings in studs that are covered by drywall or other surfacing material.

The technique of FIG. 6 also includes electrically connecting the second housing 82 (and, more specifically, components within the second housing) to privacy structure 12 using third wiring 88 (104). Again, a short section of wiring may extend from second housing 82 to provide a connection location between the housing and third wiring 88. Alternatively, second housing 82 and third wiring 88 may have complementary male/female electrical connection and engagement features that mate with each other to establish an electrical connection. In either case, the electrical connection between the second housing 82 and third wiring 88 may be established. In some examples, the connection between second housing 82 and third wiring 88 may be made and the connection then made inaccessible. The connection may be covered or otherwise obscured such that the connection is not accessible.

Third wiring 88 may extend between second housing 82 and first and second electrode layers 20, 22 of privacy structure 12. For example, third wiring 88 may extend from second housing 82 to an electrical bus bar or other electrode structure attached to each respective electrode layer. In some configurations of privacy structure 12, third wiring 88 may be electrically connected to the first and second electrode layers 20, 22 during manufacture and embedded in a polymeric material with a tail or terminal end extending out of the polymeric material. When so configured, the installer make connect the terminal end secured to privacy structure 12 directly to second housing 82 and/or utilize an intervening section of wiring between the terminal end secured to privacy structure 12 and second housing 82. In this latter application, the intervening section of wiring and terminal end of wiring extending out of privacy structure 12 may, in combination, define third wiring 88.

The systems and techniques described in this disclosure as being attributable to a driver may be implemented, at least in part, in hardware, software, firmware or any combination thereof. For example, various aspects of the described systems and techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The systems and techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. An electrically dynamic system comprising:
a first pane of transparent material;
a second pane of transparent material;
a third pane of transparent material;
a spacer positioned between the second pane of transparent material and the third pane of transparent material to define a between-pane space, the spacer sealing the between-pane space from gas exchange with a surrounding environment and holding the second pane of transparent material a separation distance from the third pane of transparent material;
an electrically controllable optically active material positioned between the first pane of transparent material and the second pane of transparent material, the electrically controllable optically active material being positioned between a first electrode layer and a second electrode layer; and
a driver electrically connected to the first electrode layer and the second electrode layer,
wherein the driver is configured to:
electrically connect to a power source that provides power at a supply voltage and a supply apparent power level;
convert power received from the power source down to a converted voltage and a converted apparent power level, the converted voltage being less than the supply voltage and the converted apparent power level being less than the supply apparent power level;
deliver power at the converted voltage and the converted apparent power level to a voltage convertor;
at the voltage convertor, increase the converted voltage to an operating voltage, thereby providing power from the voltage convertor at the operating voltage and having an operating apparent power level;
condition power received from the voltage convertor having the operating voltage and operating apparent power level to provide a drive signal; and
provide the drive signal to the first electrode layer and the second electrode layer for controlling the electrically controllable optically active material.

2. The system of claim 1, wherein the supply voltage ranges from 100 V to 250 V, and the supply apparent power level ranges from 1500 VA to 2500 VA.

3. The system of claim 1, wherein the converted voltage is less than or equal to 100V.

4. The system of claim 1, wherein the converted apparent power level is less than or equal to 100 VA.

5. The system of claim 1, wherein the operating voltage is greater than or equal to 50 V.

6. The system of claim 1, wherein the operating voltage is greater than or equal to 85 V, and the operating apparent power level is less than or equal to 100 VA.

7. The system of claim 1, further comprising a first wiring extending from the power source to the driver and a second wiring extending between the driver and the first and second electrode layers, wherein the first wiring has a thicker conductive member than a conductive member the second wiring.

8. The system of claim 7, wherein the conductive member of the first wiring has a thickness of 1.6 mm or greater, and the conductive member of the second wiring has a thickness of 1 mm or less.

9. The system of claim 1, wherein the driver comprises:
a first housing containing a power convertor configured to convert power received from the power source down to the converted voltage and the converted apparent power level;
a second housing physically separate from the first housing, the second housing containing the voltage convertor and circuitry configured to condition power received from the voltage convertor;
a first wiring extending from the power source to the first housing;
a second wiring extending from the first housing to the second housing; and
a third wiring extending between the second housing and the first and second electrode layers, the drive signal transmitting along the third wiring to the first and second electrode layers,
wherein the first wiring comprises a thicker conductive member than conductive members in the second wiring and the third wiring.

10. The system of claim 9, wherein a combined length of the second wiring and the third wiring is at least 2 feet.

11. The system of claim 10, wherein:
a connection between the first wiring and the first housing is accessible, and
at least one of the following connections is inaccessible:
a connection between the third wiring and the second housing; and
a connection between the third wiring and the first and second electrode layers.

12. The system of claim 11, wherein the connection between the third wiring and the first and second electrode layers is inaccessible, said connection being covered by a trim surrounding a perimeter of a panel defined by the first pane of transparent material and the second pane of transparent material.

13. The system of claim 1, wherein the power source is wall power that delivers alternating current.

14. The system of claim 1, wherein the driver is configured to condition power received from the voltage convertor by altering at least one of a frequency, an amplitude, and a waveform of power received from the voltage convertor.

15. The system of claim 1, wherein the first pane of transparent material and the second pane of transparent material are each laminate panes comprising a pair of glass substrates laminated together.

16. The system of claim 1, wherein the driver comprises a controller that is configured to receive input from a user control located outside of a privacy structure defined by the first pane of transparent material, the second pane of transparent material, and the electrically controllable optically active material.

17. The system of claim 1, wherein the electrically controllable optically active material is a liquid crystal material.

18. An electrically dynamic system comprising:
a first pane of transparent material;
a second pane of transparent material;
an electrically controllable optically active material positioned between the first pane of transparent material and the second pane of transparent material, the electrically controllable optically active material being positioned between a first electrode layer and a second electrode layer; and
a driver electrically connected to the first electrode layer and the second electrode layer,
wherein the driver is configured to:
electrically connect to a power source that provides power at a supply voltage and a supply apparent power level;
convert power received from the power source down to a converted voltage and a converted apparent power level, the converted voltage being less than the supply voltage and the converted apparent power level being less than the supply apparent power level;
deliver power at the converted voltage and the converted apparent power level to a voltage convertor;
at the voltage convertor, increase the converted voltage to an operating voltage, thereby providing power from the voltage convertor at the operating voltage and having an operating apparent power level;
condition power received from the voltage convertor having the operating voltage and operating apparent power level to provide a drive signal; and
provide the drive signal to the first electrode layer and the second electrode layer for controlling the electrically controllable optically active material, and
wherein the driver comprises:

a first housing containing a power convertor configured to convert power received from the power source down to the converted voltage and the converted apparent power level;
a second housing physically separate from the first housing, the second housing containing the voltage convertor and circuitry configured to condition power received from the voltage convertor;
a first wiring extending from the power source to the first housing;
a second wiring extending from the first housing to the second housing; and
a third wiring extending between the second housing and the first and second electrode layers, the drive signal transmitting along the third wiring to the first and second electrode layers,
with the first wiring comprising a thicker conductive member than conductive members in the second wiring and the third wiring.

19. The system of claim 18, wherein:
the supply voltage ranges from 100 V to 250 V;
the supply apparent power level ranges from 1500 VA to 2500 VA; and
the converted voltage is less than or equal to 100V.

20. The system of claim 18, wherein the operating voltage is greater than or equal to 85 V, and the operating apparent power level is less than or equal to 100 VA.

21. The system of claim 18, wherein the conductive member of the first wiring has a thickness of 1.6 mm or greater, and the conductive member of the second wiring has a thickness of 1 mm or less.

22. The system of claim 18, wherein:
a connection between the first wiring and the first housing is accessible, and
at least one of the following connections is inaccessible:
a connection between the third wiring and the second housing; and
a connection between the third wiring and the first and second electrode layers.

23. The system of claim 22, wherein the connection between the third wiring and the first and second electrode layers is inaccessible, said connection being covered by a trim surrounding a perimeter of a panel defined by the first pane of transparent material and the second pane of transparent material.

24. The system of claim 18, wherein the power source is wall power that delivers alternating current.

25. The system of claim 18, wherein the driver is configured to condition power received from the voltage convertor by altering at least one of a frequency, an amplitude, and a waveform of power received from the voltage convertor.

26. The system of claim 18, wherein the electrically controllable optically active material is a liquid crystal material.

* * * * *